United States Patent [19]
Larson

[11] Patent Number: 5,917,505
[45] Date of Patent: Jun. 29, 1999

[54] METHOD AND APPARATUS FOR PREFETCHING A NEXT INSTRUCTION USING DISPLAY LIST PROCESSING IN A GRAPHICS PROCESSOR

[75] Inventor: Michael L. Larson, Austin, Tex.

[73] Assignee: Cirrus Logic, Inc., Fremont, Calif.

[21] Appl. No.: 08/574,835

[22] Filed: Dec. 19, 1995

[51] Int. Cl.[6] .............................. G06F 15/00; G06T 1/00
[52] U.S. Cl. ..................... 345/522; 345/512; 345/501; 395/383
[58] Field of Search .......................... 345/418, 501–506, 345/507, 509, 510, 513, 515, 512, 516, 520–522, 526, 186, 188, 191, 203; 395/284, 287, 290, 293, 299, 800.32, 800.33, 800.34, 381–383, 386, 389; 711/213, 214

[56] References Cited

U.S. PATENT DOCUMENTS

| | | | |
|---|---|---|---|
| 4,967,375 | 10/1990 | Pelham et al. | 345/515 |
| 5,010,515 | 4/1991 | Torborg, Jr. | 345/505 |
| 5,046,023 | 9/1991 | Katsura et al. | 345/434 |
| 5,299,309 | 3/1994 | Kuo et al. | 345/512 |
| 5,321,806 | 6/1994 | Meinerth et al. | 345/522 |
| 5,388,207 | 2/1995 | Chia et al. | 345/513 |
| 5,528,764 | 6/1996 | Heil | 395/293 |
| 5,655,114 | 8/1997 | Taniai et al. | 395/580 |
| 5,664,161 | 9/1997 | Fukushima | 345/501 |
| 5,664,162 | 9/1997 | Dye | 345/521 |

FOREIGN PATENT DOCUMENTS

| | | | |
|---|---|---|---|
| 0 306 533 A2 | 3/1989 | European Pat. Off. | G06F 7/00 |
| 0 389 175 A2 | 9/1990 | European Pat. Off. | G06F 15/66 |

*Primary Examiner*—U. Chauhan
*Attorney, Agent, or Firm*—Steven A. Shaw

[57] ABSTRACT

A graphics processor for rasterizing graphics data using display list programming to a host computer system memory. The processor dynamically rasterizes the display list generated by a host processor to either graphics memory local to the graphics processor or to the host system memory. The graphics processor of the present invention includes a prefetch unit having instruction prefetch logic for prefetching and decoding next opcode instructions in a display list of instructions from system memory. Prefetching a next instruction eliminates steup time necessary to fetch subsequent opcode instructions after a first opcode instruction has been fetched. The next opcode instruction in a sequential display list of instructions is prefetched with parameter data associated with the first fetched opcode instructions to save the graphics processor extra instruction fetch cycle time necessary to fetch subsequent opcode instructions. The graphics processor further includes a bus mastering unit which allows the graphics processor to master the host computer system bus during the transfer of display list instructions from host computer system memory and the subsequent processing of these instructions in an uninterrupted mode.

11 Claims, 6 Drawing Sheets

METHOD AND APPARATUS FOR PREFETCHING A NEXT INSTRUCTION USING DISPLAY LIST PROCESSING IN A GRAPHICS PROCESSOR

FIELD OF THE INVENTION

The present invention relates to graphics processors, more specifically, the present invention relates to prefetching a next opcode instruction in a display list of instructions and relates to prefetching graphics parameters from host memory to process graphics data in a computer system.

BACKGROUND OF THE INVENTION

Substantial improvements in graphics hardware combined with standardized graphics languages have allowed the use of complex graphics functions in many common applications. As these applications increase, more and more graphics functionality are moved from the central processing unit to the graphics processor in a computer system. Thus, the graphics processor is now able to perform many functions so as to not slow down the performance of the computer system.

Many prior art graphics subsystems are implemented with a host processor constructing and generating a display list of instructions comprising graphics opcode instructions and parameters which are sent to a graphics processor. The graphics processor takes the list of instructions and creates or generates graphics primitives for a display device. In these graphics systems, information for the graphics processor may be supplied in a series of graphics primitives and are processed by the graphics processor by reading the display list data from linear memory locations which store these primitives.

These graphics primitives are constructed into graphics images displayed on a graphics display device. The graphics primitives typically include points, lines, and polygons representing graphics objects rendered by the graphics processor.

Prior art display list processing methods read display list instructions from a linear array of memory locations and, depending on the instructions, may continue to read the number of parameters needed to complete the instructions from consecutive memory locations. After each instruction is completed by the graphics processor, another iteration of fetching display list instructions is performed until the contents of the display list is completely processed.

Improvements have been made in the prior art to optimize the interface between graphics processors and host processors which execute display list instructions in order to minimize latency in instruction fetching and processing by graphics processor. One such improvement is the use of first-in-first-out data buffers which typically store up to 32 bytes of data. The FIFOs are added to the graphics processor to improve the graphics interface and also to improve the bandwidth needed by the host processor to process display list instructions.

The FIFOs further allow some level of concurrency between the host processor and the graphics processor. However, once a FIFO is full the host processor may be forced into wait states to enable the graphics processor to finish processing the display list instructions supplied by the host processor. Such wait states create inherent processing latency making it difficult for the graphics processor to process fast-paced computer graphics games and other fast paced interactive graphics programs.

Even if the graphics processor is capable of operating at high speeds required for graphics applications like 3D animations etc., the system bus found in many prior art computer systems may be too slow to allow sufficient transfer of data between the host processor and the graphics processor to alleviate any inordinate amount of wait states which may be experienced by the host processor.

Particularly, if the host processor loads one command and attempts to load additional commands and parameters into the graphics processor, the graphics processor may be busy processing previous commands and parameters. This may cause the graphics processor to assert a signal forcing the host processor into wait states. Consequently, the host processor may experience a significant number of wait states and can only load the next command and parameters when the graphics processor has completed processing its present command.

To alleviate the number of wait states experienced by the host processor in sending display list instructions to the graphics processor, many prior art systems require the graphics processor to process the display list to a frame buffer. The frame buffer may be on-chip and may not compete for the computer system's bus with the host processor or the graphics processor. Rendering of graphics primitives from the display list to the frame buffer allows the host processor to continue processing without any interruptions from the graphics processor while the graphics processor is rendering instructions from a previously supplied display list into a display space, e.g., 2D or 3D space.

Despite the reduction in wait states as a result of the graphics processor processing the display list to the frame buffer, many prior art graphics subsystems are prefabricated with a specific amount of frame buffer memory. This limits the amount of data that the graphics processor can render to the frame buffer. Such a limitation often hinders sophisticated graphics operations and functions such as polygon drawings, filling, and texture mapping by the graphics processor. In order to be able to increase the amount of memory available to graphics operations in a computer system, some prior art graphics systems allow host processors to write display list information to parts of host computer system memory. This alleviates the display memory constraints imposed by limited frame buffers in prior art graphics systems.

However, storing display list information in the host system memory may impose further restraints on the graphics processor during the processing of display list information. These restraints include the extraneous number of clock cycles needed to fetch and decode display list parameters from the host system memory. For example, during a request to the host memory by the graphics processor, if an instruction fetch cycle and a parameter fetch cycle are executed separately, the display logic may be required to request in a single transfer from the host processor with multiple parameters to engage in a multi-cycle transfer from the host memory.

And depending on the number of parameters needed, the graphics processor may have to make separate host memory requests and access to fetch display list instructions and parameters. Since each memory transfer requires a finite period of time to complete the first transfer ( i.e., setup time ) a single request to the host processor would require at least two setup periods e.g., one for fetching display list instructions and the other for fetching display list parameters for a specific instruction.

Thus, in a single request cycle to the host system memory, an instruction fetch may take about 4 clocks of setup time for transferring the requested instruction, e.g., one clock for data transfer, and about four clocks to fetch parameters. If an opcode instruction setup time could be removed during the fetching of parameters responsive to an opcode instruction, a total of 4 clocks could be saved. Consequently, the number of clocks required to perform a single instructional fetch operation from a display list may be reduced.

It is therefore desirable to provide an improved graphics data and instruction processing method for a computer system which allows processing of sophisticated graphics functions and operations without the inefficiencies and bottlenecks of prior art systems, e.g, without the extra number of cycles required to fetch and decode display list instructions from a host computer's main memory.

SUMMARY OF THE INVENTION

The present invention provides a computer system having a graphics processor with the capabilities of implementing display list processing in response to display tasks presented by a host processor in a reduced number of instruction prefetch cycles. A display list packet may generally comprise multiple commands or instructions with each instruction including one or more command parameters. Each display list command may be implemented using a mathematical protocol where a relatively small number of parameters or data are transferred across a system bus, such as the Peripheral Component Interconnect (PCI) bus, from main memory and loaded into the graphics processor. The display list commands typically include drawing instructions for lines, triangle, polygons, and other instructions for drawing a particular graphics element.

In the present invention, a display list of data is sent through a host interface unit of the graphics processor to an execution unit in the graphics processor to be processed. In the display list processing method of the present invention, an opcode is received as the first piece of data within the display list. The opcode instructs the graphics processor on decoding the remaining stream of data within the display list.

In the preferred embodiment of the present invention, a second opcode instruction representing a subsequent stream of data within the display list may be decoded during a first parameter data transfer cycle of parameter data corresponding to the first decoded opcode instruction. Prefetching subsequent opcode instructions after the first opcode instruction has been fetched saves the graphics processor time in fetching and decoding the second opcode instruction after the first opcode or parameter has been processed.

A master peripheral interconnect interface (PCI) bus mastering unit is integrated in the graphics processor to enable the graphics processor to "master" the PCI bus in the host system during display list access requests to host system memory to fetch and prefetch display list instructions. Mastering the PCI bus allows the graphics processor to fetch and completely process display list instructions from system memory locations without any interruptions from other peripheral devices in the computer system to fetch and prefetch display list instructions presented by the host processor.

The preferred embodiment of the graphics processor of the present invention further includes an instruction prefetch unit which interfaces with the PCI unit for prefetching instructions within the display list instructions, while previously fetched instructions are being processed in the graphics processor to ensure continuous display list processing. The prefetch unit generates PCI bus address requests to the PCI bus master unit for reading instructions from a display list and internal module addresses for writing data to the graphics processor.

The prefetch unit includes an opcode instruction storage unit which includes decoding logic for storing and decoding instruction opcode to determine instruction conditions in the graphics processor. These instruction conditions may include loading of parameter data into a drawing engine in the graphics processor. In decoding instruction opcode, the prefetch unit may determine how many parameters may be passed into the graphics processor before the instruction is executed. By this method, the prefetch unit knows where the next instruction boundary is located within a sequential display list of instructions in main memory before the instruction is prefetched.

The prefetch unit also includes a First-In__First__Out (FIFO) data storage unit for storing parameters associated with each of the opcode instructions presented in a display list. Parameter data is written in and out of the parameter FIFO data storage unit as instructions are sequentially decoded by the opcode instruction storage unit.

A state machine is further included in the prefetch unit to control the various instruction prefetch states of the prefetch unit. In the preferred embodiment of the present invention, the state machine restricts next instruction prefetch and decoding to two clock cycles in order to prevent the graphics processor from incurring unnecessary clock cycles.

Thus, unlike prior art display list processing where subsequent instructions fetches required extra clock cycles for setting-up the transfer of opcode instructions, the novel state machine of the prefetch unit allows the prefetch unit to extend a parameter data fetch corresponding to a first decoded opcode instruction to be extended by a clock cycle. This is done in order to prefetch a subsequent opcode instruction. Prefetching subsequent opcode instructions while fetching parameter data corresponding to a previously fetched opcode instruction eliminates the need for the extra 4–6 clock cycles needed to setup the transfer of opcode instructions, as practiced in the prior art, after the processing of a first opcode instruction.

Advantages of the present invention include enabling the graphics processor to decode new instructions while processing previously fetched instructions. The present invention also provides the advantage of eliminating extraneous instruction transfer setup time for subsequent opcode instructions fetches after a first the opcode instructions has been fetched and processed. Such time saving improves the overall performance of the graphics processor.

The present invention further has the advantage of allowing the graphics processor to bus master the computer system bus to perform graphics rasterization to the host memory. The ability to master the computer system bus enables the graphics processor to communicate directly to the host memory without waiting for bus permission from the central processing unit of the computer system which may sometimes be time consuming.

BRIEF DESCRIPTION OF THE DRAWING

The various features and advantages of the present invention will become apparent from the following detailed description taken in conjunction with the accompanying drawings, wherein like references numerals designate like structural elements, and in which.

DESCRIPTION OF THE PREFERRED EMBODIMENTS

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Figure 1:
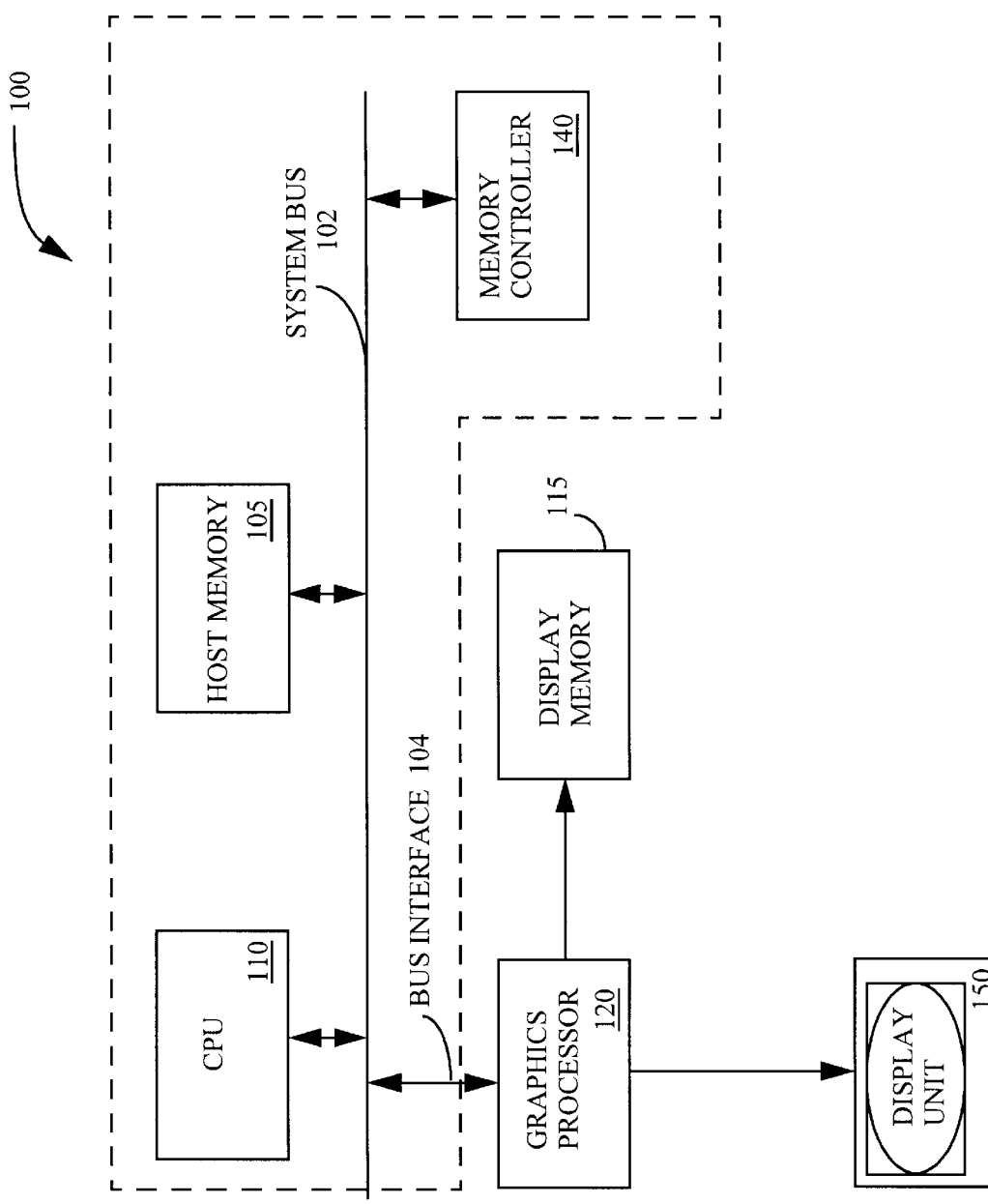
FIG. 1 is a simplified block diagram of a graphics system coupled to a system bus of a host computer system in which the graphics system includes a graphics processor implemented according to the present invention.

With reference to FIG. 1, a simplified block diagram is shown of a graphics system coupled to a system bus 102 of a host computer system 100, wherein the host computer includes a central processing unit (CPU) 110, host memory 105 which may be implemented as a dynamic random access memory (DRAM) or the like, display unit 150, and a graphics processor 120 implemented according to the teachings of the present invention. The system bus 102 may be one of a plurality of different types of host buses. In the preferred embodiment of the present invention, system bus 102 may preferably be implemented as a Peripheral Component Interconnect (PCI) bus which allows CPU 110 and other peripheral components of computer system 100 to transfer data at bandwidth higher than other buses known in the art.

CPU 110 is coupled to system bus 102 and is for processing data and instructions. CPU 110 also constructs and supplies display list information comprising graphics data and instructions utilized by graphics processor 120. CPU 110 transfers any display list information constructed to host memory 105 to be stored for subsequent transfer to graphics processor 120.

Graphics processor 120 of FIG. 1 preferably may be a 32-bit or 64-bit graphics processor operating at a frequency of at least 33 megahertz (MHZ) although other well known graphics processors may be used. Graphics processor 120 is coupled to system bus 102 through a bus interface 104 which may allow graphics processor 120 gain control of system bus 102 as a PCI bus master, or serve as a PCI slave device on system bus 102. Graphics processor 120 may also receive display list information for graphics primitives to be drawn to display unit 150 from CPU 110. Graphics processor 120 further includes a prefetch unit (shown in FIG. 2) which allows graphics processor 120 to prefetch and store subsequent instructions from a display list for processing while a previously fetched instruction is still being processed.

Graphics processor 120 may rasterize the display list information from CPU 110 to either display memory 115 or host memory 105 depending on address offsets in a particular display list information supplied by CPU 110. In one embodiment of the present invention, display memory 115 may be implemented in a Rambus dynamic random access memory (RDRAM) device, and may include a frame buffer for storing X,Y information representing graphics primitives for rendering to display unit 150. Display memory 115 may also include a Z-buffer for storing depth information representing depth values of the graphics primitives rendered.

Display unit 150 of FIG. 1 may be any type of graphics display device, such as a cathode ray tube (CRT) for desktop, workstation or server application, or a liquid crystal display (LCD) or the like commonly used for portable computers. It is understood that the particular embodiment of computer system 100 and graphics processor 120 shown in FIG. 1 is only one of many possible configurations of a graphics system for use in a personal computer. FIG. 1 is simplified for purposes of clarity, for example, many control signals and other component devices are not shown.

Figure 2:
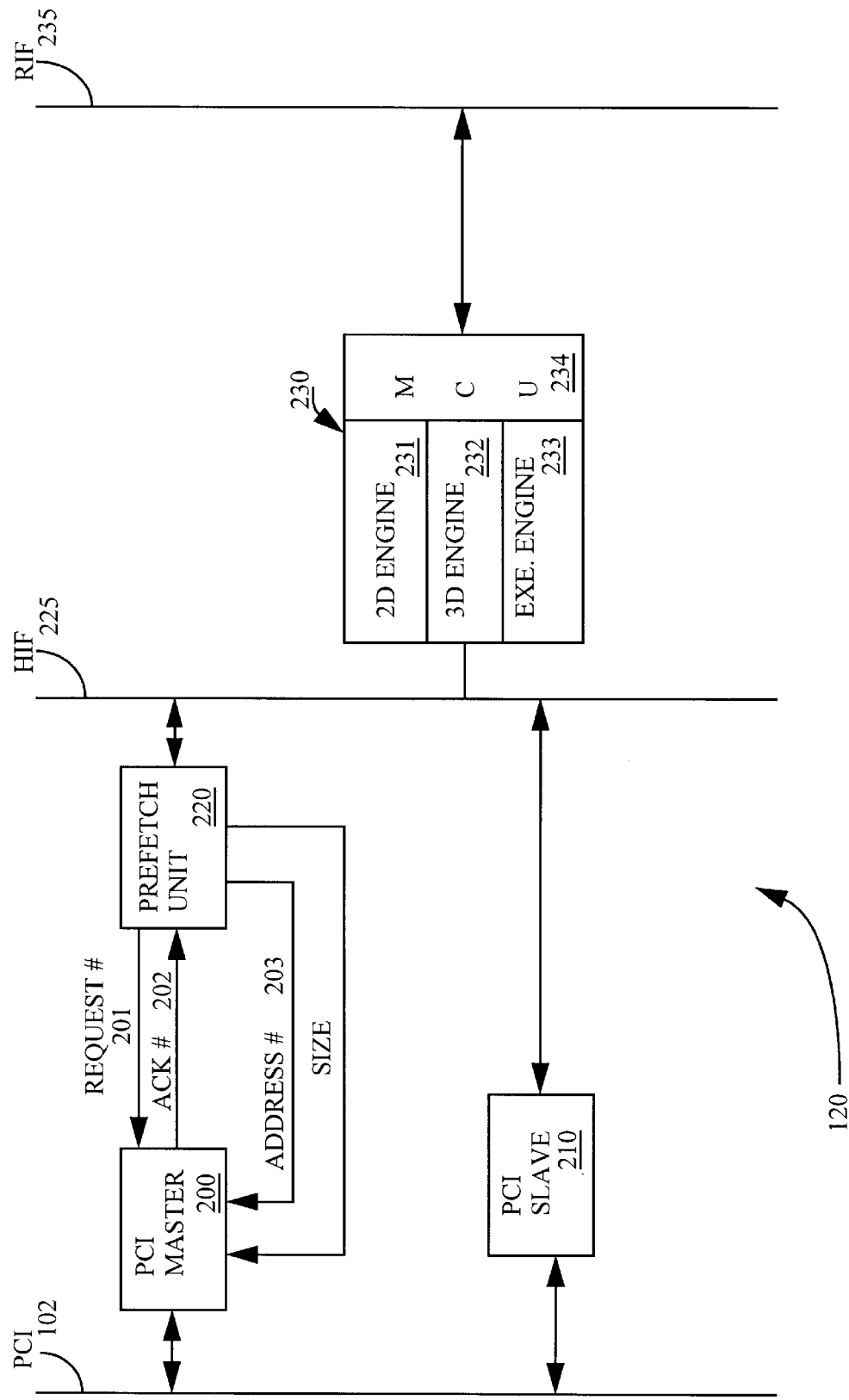
FIG. 2 is a simplified block diagram of the graphics processor of FIG. 1.

Referring now to FIG. 2, a simplified block diagram illustrating the internal architecture of graphics processor 120, in FIG. 7, is shown. In one embodiment, graphics processor 120 may preferably be implemented around two internal buses (1) a host interface bus (HIF) 225 and (2) a Rambus interface bus (RIF) 235. HIF 225 is coupled to an external host bus through a host interface unit and in one embodiment RIF 235 is coupled to a Rambus access channel interface. Graphics processor 120 includes a Peripheral Component Interconnect (PCI) bus master unit 200, PCI slave unit 210, prefetch unit 220, and 2D/3D graphics drawing engine 230. Graphics processor 120 is coupled to PCI bus 102 to communicate with CPU 110 and host memory 105. PCI bus 102 includes data and control signals that interface to graphics processor 120 to transfer data and instructions from host memory 105 and CPU 110 respectively. Graphics processor 120 may also use PCI bus 102 to communicate with other peripheral devices(e.g., memory controller 140) in computer system 100 in a manner well known in the art.

PCI master unit 200 is coupled to PCI bus 102 to allow graphics processor 120 gain access and control of PCI bus 102. PCI master unit 200 includes additional logic to generate control signals to arbitrate for control of PCI bus 102 by graphics processor 120 when PCI bus 102 is being controlled by CPU 110. There are several modes in which graphics processor 120 may require mastership of PCI bus 102. The most common of the bus mastership requirements is for display list instruction processing.

In the preferred embodiment of the present invention, display list processing is initiated by graphics processor 120 mastering PCI bus 102 and reading instructions and corresponding parameter data from host memory 105. When graphics processor 120 is not bus mastering PCI bus 102, graphics processor 120 acts as a slave device to CPU 110 by interfacing to PCI bus 102 through PCI slave unit 210.

PCI slave unit 210 of FIG. 2 is coupled to PCI bus 102 and host interface bus (HIF) 225 to allow graphics processor 120 process display list instructions previously supplied by CPU 110 while CPU 110 may still be sharing PCI bus 102 for other tasks. PCI slave unit 210 includes control logic to enable graphics processor 120 to relinquish control of PCI bus 102 to CPU 110 (in a manner well known in the art) after graphics processor 120 has gained control of PCI bus 102 to fetch and prefetch instructions from memory locations in host memory 105 to prefetch unit 220.

Prefetch unit 220 is coupled to both PCI master unit 200 and HIF 225 to interface with an instruction execution engine 233 in drawing engine 230. Prefetch unit 220 performs instruction look-ahead functions of graphics processor 120 by identifying and determining whether display list instructions are consecutively stored in host memory 105. Instruction look-ahead functions include examining the address offsets of display list instructions in host memory 105 to identify the location of these instructions. Prefetch unit 220 applies the locality principles of memory access (known in the art) to access opcode instructions which may be stored in consecutive locations in host memory 105.

Prefetch unit 220 enables graphics processor 120 to prefetch and store instructions while the execution engine 233 of drawing engine 230 are processing previously fetched display list instructions. Prefetching instructions also enables graphics processor 120 to continue processing display list instructions even after control is relinquished on PCI bus 102 upon being interrupted by CPU 10.

Prefetch unit 220 also includes logic to queue display list transactions when drawing engine 230 is busy drawing previously rasterized display list instructions. Additionally, prefetch unit 220 generates PCI bus addresses for reading from host memory 105 and display memory 115, and the internal graphics processor 120 module address for writing to host memory 105. During an instruction execution when an address for a data transfer is not physically located within display memory 115, graphics processor 120 may allow read and write operations between host memory 105 and display memory 115 memory locations.

To initiate instruction fetch and prefetches from host memory 105, prefetch unit 220 of FIG. 2 asserts address request lines 201 and drives a memory location address via address request lines 201 to PCI bus master unit 200. Asserting address request lines 201 to PCI bus master unit 200 causes graphics processor 120 to assume control of PCI bus 102 in a manner well known in the art.

PCI bus master unit 200 acknowledges receipt of the address request from prefetch unit 220 by asserting acknowledgment lines 202 to prefetch unit 220. Upon receiving acknowledgement signal from acknowledgment lines 202, prefetch unit 220 drives a host memory 105 location address request via address lines 203 to begin fetching display list instructions. Graphics processor 120 maintains control of PCI bus 102 during display list instruction fetches from host memory 105 to continue fetching instructions until the display list is empty.

Drawing engine 230 is coupled to HIF 225 and RIF bus 235 to receive and render 2D and 3D graphics objects to display unit 150. Drawing engine 230 includes a 2D 231 and a 3D 232 hardware polygon and line draw engines for drawing 2D/3D graphics images to display unit 150. Graphics processor 120 typically accesses registers within 2D drawing engine 231 to program desired 2D functions to display unit 150. Host interface buffers within 2D drawing engine 231 buffers graphics parameters via its command buffers to enable graphics processor 120 to continue processing other tasks.

To relieve data traffic congestion on buses HIF 225 and RIF 235, a secondary buffer in 2D drawing engine 230 buffers commands and data processed in drawing engine 230. When 2D drawing engine 231 completes a current drawing operation, the parameters stored in the secondary buffers are transferred to a secondary queue to start the next graphics operation. Graphics processor 120 may also access instruction registers in 3D drawing engine 232 to draw 3D objects to the display memory 115 in a manner similar to the drawing operations in 2D drawing engine 231.

Memory control unit (MCU) 234 is coupled to 2D drawing engine 231 and 3D drawing engine 232 to serve as a gateway to a Rambus interface coupled to display memory 115 of FIG. 2 offering at least 500 mbytes per second bandwidth per channel in one embodiment. MCU 234 may allocate display memory 115 memory bandwidth among various functions, such as RDRAM refresh, screen refresh, and 2D drawing engine operations performed during a CPU access. RIF bus 235 includes data and control signals to interface graphics engine unit 230 to a RIF and RAC units in display memory 115 of the graphics subsystem of the present invention.

Figure 3:
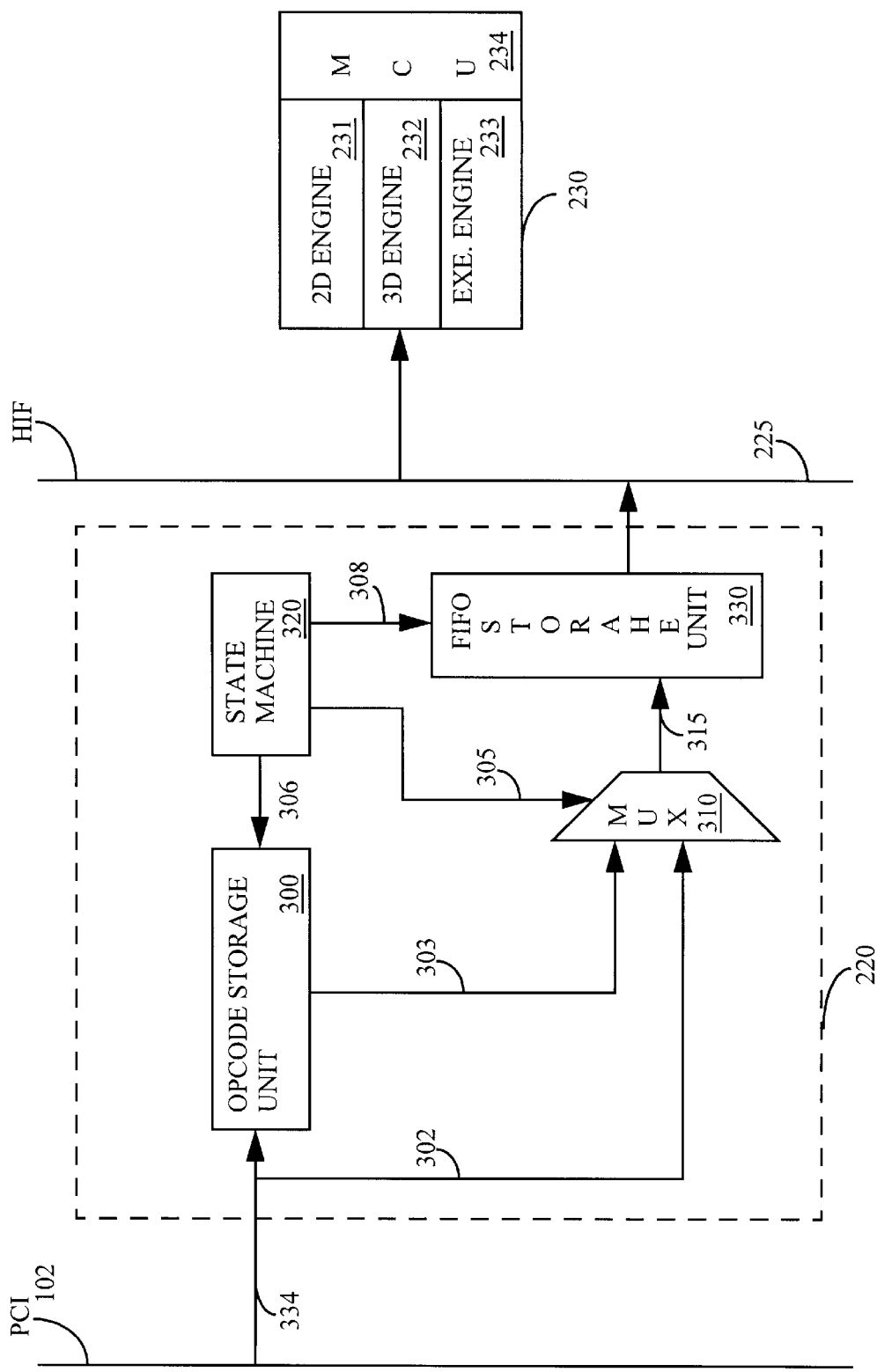
FIG. 3 is a simplified block diagram showing the detail of the internal architecture of the prefetch unit of one embodiment of the present invention.
Figure 4:
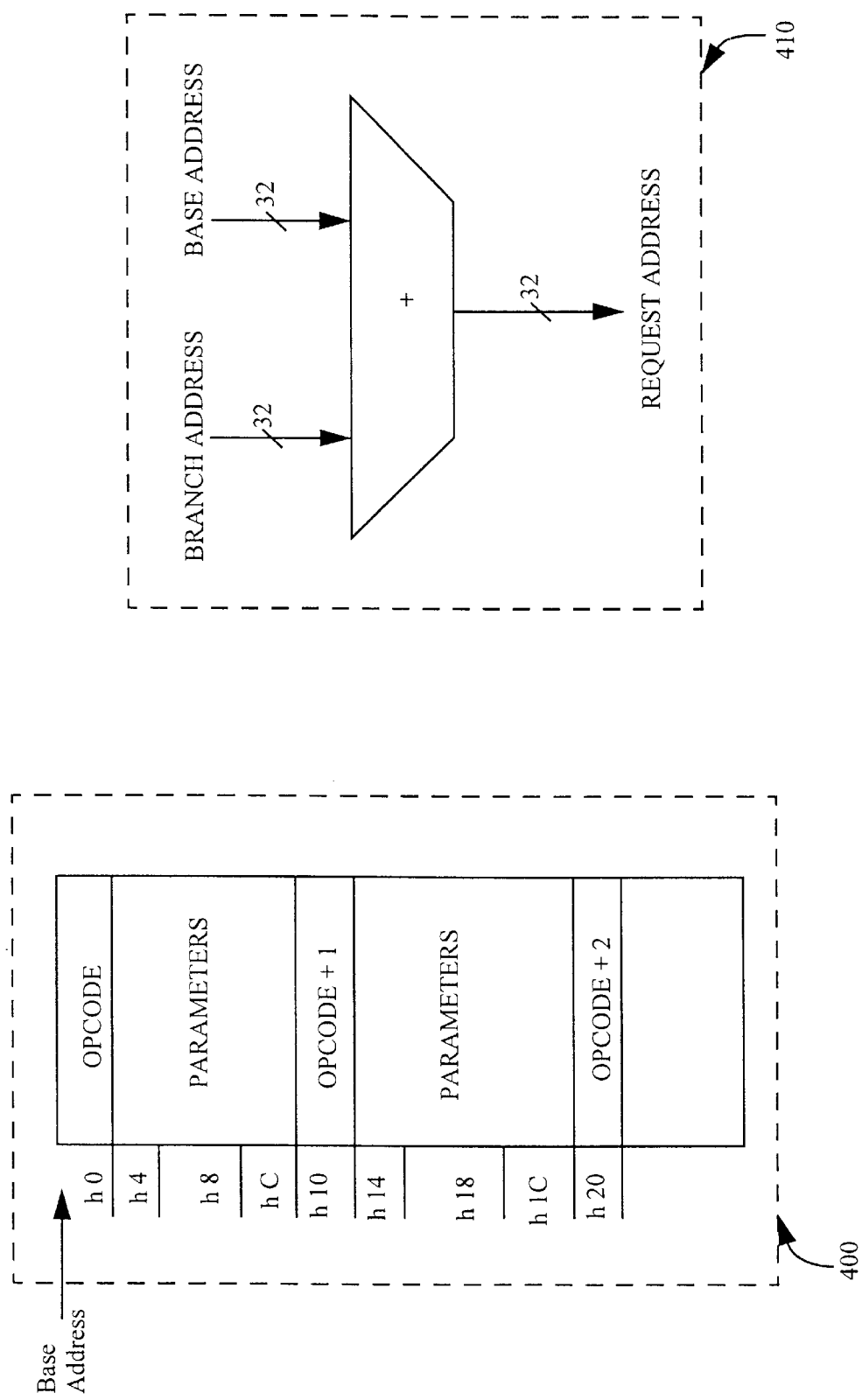
FIGS. 4A and 4B are simplified block diagrams illustrating an opcode instruction register and address summing in the graphics processor of the present invention respectively.

FIG. 3 is a simplified block diagram which shows the internal architecture of one embodiment of prefetch unit 220 along with drawing engine 230. Prefetch unit 220 may include an opcode storage unit 300, a multiple input multiplexor (MUX) 310 with a single data output port 315, said MUX is coupled to opcode storage unit 300, and a First-in-first-out data storage unit 330 which may be coupled to MUX 310. Prefetch unit 220 may also receive acknowledgment control signals from PCI master unit 200 via control signal line 334 for notifying prefetch unit 220 when PCI master unit 200 receives memory access requests to host memory 105.

Opcode storage unit 300 of FIG. 3 stores opcode instructions from the display list instructions supplied by CPU 110 to graphics processor 120. In one embodiment of the present invention opcode storage unit 300 may be implemented as a 32-bit wide register. It is appreciated that opcode storage unit 300 may also be implemented as a 64-bit wide register. The opcode instructions may include data specifying destination registers and the number of parameters to follow the opcode instructions. For example, the top 6 bits of opcode storage unit 300 may store data describing the type of operation to be performed by drawing engine 230.

A state machine 320 in prefetch unit 220 may be coupled to opcoded storage unit 300, MUX 310, and FIFO data storage unit 330. State machine 320 includes control logic to control various prefetch states of display list instructions from memory 105 and may include decode logic as described in the next paragraph. State machine may further include extension logic to extend parameter data fetch cycles for parameter data associated with opcode instructions by one clock in order to prefetch a subsequent opcode instruction after the first opcode instruction is fetched.

In the preferred embodiment, decoding logic in prefetch unit 220 decodes the instructions stored in opcode storage unit 300 to determine display list processing status, and the amount of parameter data supplied in a particular display list. When processing display list information, opcode instruction decode may allow prefetch unit 220 to load parameter data from its internal registers into the execution engine 233 of drawing engine 230. Prefetch unit 220 may also read a field of opcode word and determine how many parameters to be passed to the execution engine 233 of drawing engine 230 before a subsequent instruction is passed to host memory 105. Decoding opcode instructions allows prefetch unit 220 to determine where the next instruction is located within a sequential display list of instructions in host memory 105.

MUX 310 of FIG. 3 is coupled to opcode storage unit 300 via input line 303 and to PCI bus 102 via input line 302 to receive display list parameters from CPU 110 and any associated opcode information from opcode storage unit 300 respectively. MUX 310 outputs the display list parameters of a currently accessed host memory 105 location via output line 315 to FIFO data storage unit 330 for storage. MUX 310 may also act as counter for counting the number of opcode instructions processed in a single display list of instructions fetched from host memory 105. Counting the number of opcode instructions fetched may allow prefetch unit 220 to determine when a display list of instruction has completely been processed.

First-in-first-out (FIFO) data storage unit 330 stores display list parameters of objects to be drawn by drawing engine 230. FIFO data storage unit 330 in one embodiment may be implemented as a bidirectional 8-word deep and 32-bit wide register for receiving and writing display list parameters to drawing engine 230. Alternatively, FIFO data storage unit 330 may also be implemented as a 64-bit wide register.

The processing states of prefetch unit 220 may be controlled by state machine 320 which may be coupled to opcode storage unit 300, MUX 310, and FIFO data storage unit 330. State machine 320 includes control logic to control various prefetch states of display list instructions from memory 105. In the present invention, state machine 320 further includes extension logic to extend parameter data fetch cycles for parameter data associated with opcode instructions by one clock in order to prefetch a subsequent (i.e., next) opcode instruction after the first opcode instruction is fetched.

In extending a parameter fetch cycle, graphics processor 120 saves about 4–6 clocks, it may require in set-up time, to transfer a next opcode instruction from host memory 105 after the parameter data associated with a previously fetched opcode instruction is completely processed. Prefetching the next opcode instruction with a first parameter data also eliminates the need for graphics processor 120 to assert a separate memory access request to host memory 105 (as is the practice in the prior art) to access a next opcode instruction. Eliminating the setup time to prefetch subsequent opcode instructions also reduces the number of memory cycles that graphics processor 120 initiates on PCI bus 102 thereby reducing the amount of traffic on PCI bus 102.

FIGS. 4A and 4B illustrate the display list storage register in CPU 110 and the summing of a branch address and a base address in graphics processor 120. In the present invention, graphics processor 120 display list processing may be used to draw primitives to display unit 150 and memory devices on PCI bus 102, such as host memory 105. Instruction register 400 may be mapped into an address space in CPU 110 to be used to instruct graphics processor 120 to branch to a display list located in host memory 105.

Instruction register 400 includes opcode instructions and parameters which may be used by graphics processor 120 to respectively determine the instructions to perform and what parameters to fetch from host memory 105. The parameters contained in instruction register 400 helps determine what primitives may be drawn by graphics processor 120.

In FIG. 4B, the summing operation of the branch and base address in one embodiment of graphics processor 120 is illustrated. To begin display list execution, the base memory location may be programmed to host memory 105 and a branch instruction is then written to instruction register 400. After the branch address is written, graphics processor 120 may request the first instruction from host memory 105. Graphics processor 120 may then decode the first instruction for the number of parameters needed for completion of the instruction. Rather than requesting the needed number of parameters from host memory 105, graphics processor 120 may request the number of parameters needed and the next consecutive location from host memory 105 (i.e., the next instruction). The currently fetched instruction may be completed and the next instruction may then be decoded to begin another loop.

Figure 5:
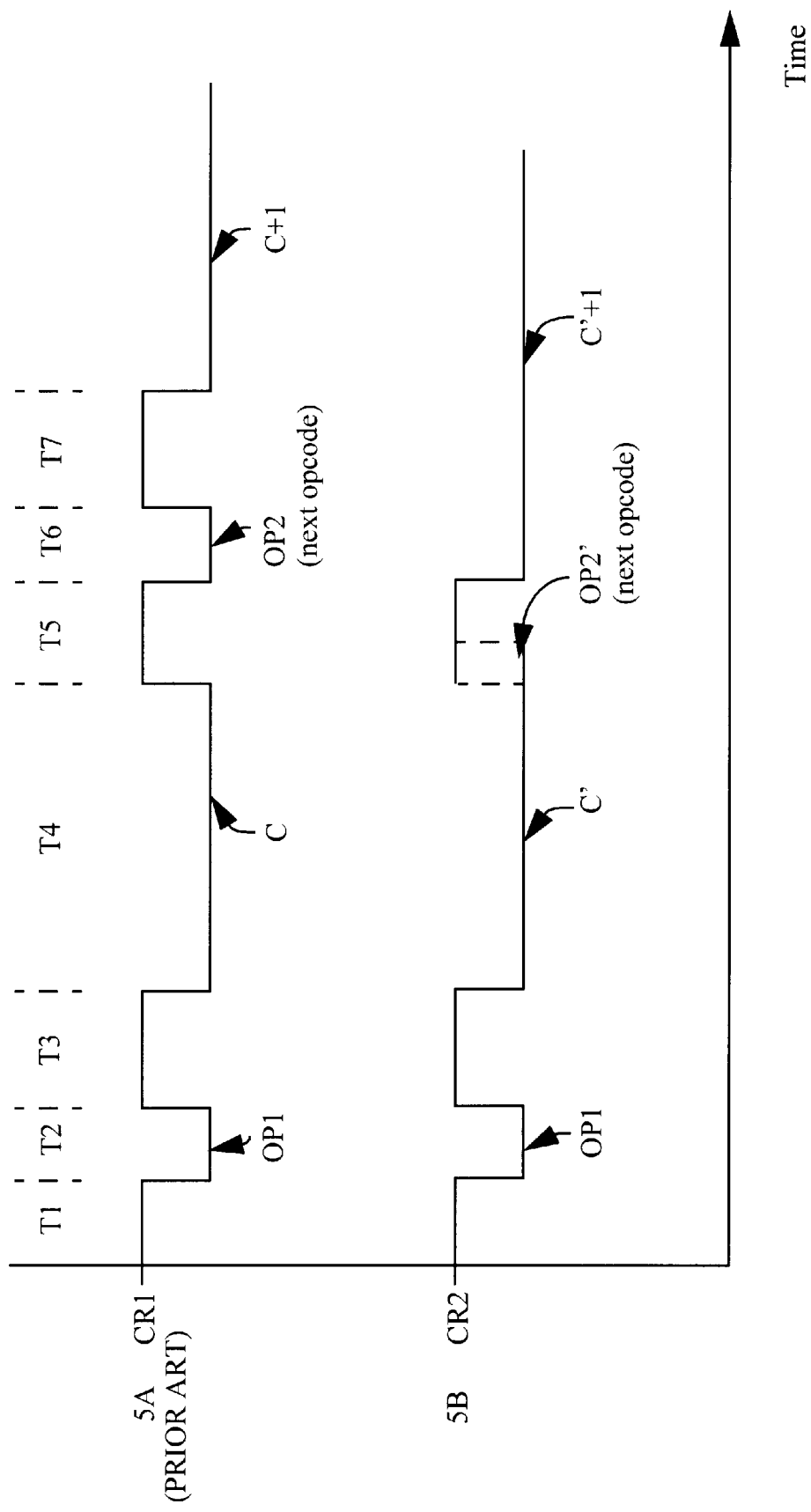
FIGS. 5A and 5B is a timing diagram illustrating aspects of the next instruction prefetch method of the present invention.

FIG. 5 is a timing diagram illustrating the difference in instruction transfer setup times between the prior art method of processing display list instructions and the display list processing method of graphics processor 120 of the present invention. The timing method includes timing signal CR1 5A illustrating instruction fetching and decoding in the prior art and timing signal CR2 5B illustrating instruction fetching and decoding in the present invention.

As shown in FIG. 5, in the prior art, an opcode instruction fetch from memory begins when CR1 is asserted for a setup time of T1 (about 4 clocks). At time T2, opcode instruction OP1 is fetched from memory and transferred to the graphics processor. At time T3, the graphics processor asserts signal CR1 again to begin a parameter data access from host memory 105 after decoding the opcode instruction.

Asserting CR1 at the beginning of time T3 requires a setup time of T3 to begin transferring parameter data from host memory 105 to graphics processor 120. After the graphics processor has received the first parameter data C, a third memory access request is initiated to fetch the second opcode instructions in the display list presented to the graphics processor. A third setup time T5 (about 4 clocks) is required to prepare transferring the second opcode instruction from host memory 105 to graphics processor 120.

At the end of time T5, the second opcode instruction OP2 is fetched from host memory 105. Graphics processor 120 continues to fetch opcode instructions and parameter data in this manner until the display list is empty.

In the present invention as illustrated by signal CR2 of FIG. 5, graphics processor 120 fetches the first opcode instruction in a manner similar to the prior art method (i.e., by asserting CR2 and holding the signal high for as setup time of T1). The first opcode instruction is then fetched at the end of time T1 and transferred to the graphics processor. At the beginning of time T2, the graphics processor 120 asserts signal CR2 to initiate the transfer of parameter data C' from host memory 105. As shown in FIG. 5 with reference to FIG. 2, graphics processor 120 of the present invention with the help of prefetch unit 220 is able to prefetch the next opcode instruction by extending the transfer time of parameter data C' by an additional clock (i.e., time T4).

Thus, graphics processor 120 saves the extra time (e.g. as major portion of time T5 and all of time T6) required to setup and transfer the next opcode instruction OP2'. Rather than using time T5 for setup time to fetch the next opcode instruction, as would have been the case in the prior art, graphics processor 120 is able to begin transferring parameter data associated with opcode instruction OP2' at the beginning of time T6 which in the prior art would have been the beginning of the next opcode instruction transfer cycle.

Figure 6:
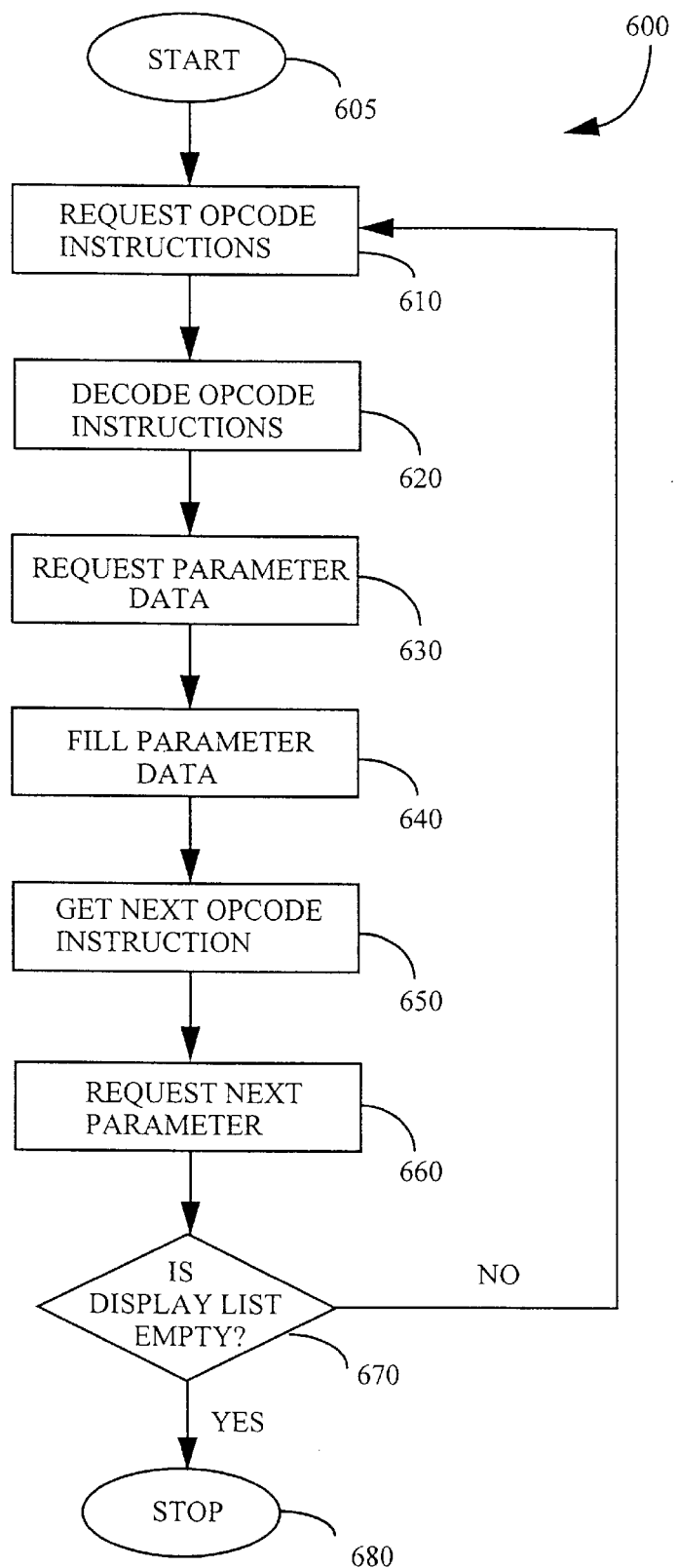
FIG. 6 is a simplified flow diagram of an example of a display list instruction stored in the host memory of a computer system of the present invention.

FIG. 6 is a flow chart illustrating the instructions prefetching method 600 of the present invention. It is assumed that instructions prefetched by the present invention constitute as display list, and are consecutively stored in host memory 105 locations external to the graphics processor 120 of the present invention.

Instruction prefetching begins at block 605 when graphics processor 120 issues an access request to host memory 105. At block 610, a request to fetch the first opcode instruction contained in the display list being accessed is made to host memory 105 by graphics processor 120 upon receiving an acknowledgment signal from host memory 105. Graphics processor 120 fetches the first opcode instruction and subsequently decodes the opcode instruction at block 620 to determine the sort of graphics parameters which may be fetched from host memory 105.

At block 630, graphics processor 120 initiates as request to host memory 105 to fetch the parameters associated with the first opcode instructions decoded. The parameter fetch cycle is followed by fetching the requested parameter at block 640 to fill the parameter storage unit 330 in graphics processor 120. The parameter fetch at block 640 includes a prefetch of the next opcode instruction contiguous to the first opcode instruction.

At block 660, graphics processor 120 initiates a request to host memory 105 to fetch the parameter associated with the next opcode instruction fetched at box 650. The next parameter fetch includes a prefetch of the next opcode instruction.

At block 670 the graphics processor 120 initiates as request to host memory 105 to determine whether there are anymore instructions in the display list being processed. If there are no more instructions, display list processing ends. If there are more instructions in the display list, graphics processor 120 continues to fetch instructions at block 610.

Thus, a method and apparatus for dynamically rasterizing display list information to a host system memory external to a graphics processor has been described. From the above description, it will be apparent that the invention disclosed herein provides a novel and advantageous method and apparatus for executing display list information in as computer system. The foregoing discussion discloses and describes exemplary method and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any host processor platform, including Intel's X86 processor architecture, the Power PC, DEC Alpha, etc., and could be used with any processor instruction set. The following claims are indicative of the scope of the invention. All variations which come within the meaning and range of equivalency of the claims are to be embraced with their scope.

I claim:

1. A computer system, comprising:

a peripheral component interconnect bus;

a host processor coupled to said bus for processing data and instructions, said processor for generating as display list of instructions representing graphics primitives to be displayed by a display unit;

a host memory coupled to said bus for storing said display list instructions including opcode instructions and parameter data responsive to said opcode instructions, wherein said display list is stored in consecutive locations in said host memory; and a graphics processor coupled to said bus for processing and executing said display list instructions specifying command instructions in said display list instructions, wherein said graphics processor prefetches and processes a second opcode instruction while fetching and processing a first parameter data responsive to a first opcode instruction.

2. The computer system of claim 1 wherein said graphics processor comprises a controlling means for allowing said graphics processor to control said bus to access said display list instructions from said host memory.

3. The computer system of claim 1 wherein said graphics processor is for prefetching said first parameter data and said second opcode instruction during as single memory access to said host memory.

4. The computer system of claim 3 wherein said first parameter data and said second opcode instruction are stored in consecutive locations respectively in said host memory.

5. A graphics processor for prefetching and processing display list instructions, said graphics processor comprising:

a first local interface bus for communicating data and instructions to an external host processor which is coupled to a first memory source;

a second local interface bus for communicating data and instruction from said graphics processor to a second memory source;

a graphics drawing engine coupled to said first local interface bus and said second local interface bus for generating data indicative of two and three dimensional graphics images;

an instruction prefetch unit coupled to said first local bus for fetching parameter data responsive to a first opcode instruction from said first memory source while prefetching a second opcode instruction from said first memory source, said second opcode instruction decoded simultaneously with processing of said parameter data; and a bus mastering unit coupled to said instruction prefetch unit for controlling instruction accesses to said first memory source by said graphics processor to fetch said opcode instructions and parameter data.

6. The graphics processor of claim 5 wherein said prefetch unit further comprises logic to prefetch said consecutive opcode instruction and said parameter data representing said first opcode instruction in a single access request to said first memory source.

7. The graphics processor of claim 6 wherein said prefetch unit further comprises logic for decoding instructions within internal register locations of said graphics processor to determine execution state of said display list instructions.

8. A method of prefetching opcode instructions in a display list of graphics instructions stored in consecutive memory locations to reduce the processing time of said opcode instructions, the method comprising the steps of:

(a) fetching a first opcode instruction from a display list of instructions from a source memory location;

(b) fetching a first parameter data associated with said first opcode instruction from the display list;

(c) prefetching a second opcode instruction from a memory location consecutive to said first opcode instruction in parallel with step (b);

(d) storing said prefetched second opcode instruction in an opcode storage register; and (e) decoding said second opcode instruction simultaneously with processing said first parameter data in a single processing cycle.

9. The method of claim 8 further comprising the step of fetching a second parameter data associated with said second opcode instructions during a memory request subsequent to said step (c).

10. The method of claim 8 wherein said prefetching step includes the step of counting the number of subsequent opcode instructions stored in consecutive locations of said source memory to process all opcode instructions in said display list of instructions.

11. The method of claim 10 wherein the opcode prefetching step (c) further comprises the step of storing and writing parameter data associated with said prefetched second opcode instruction out of a first-in first-out data register prior to a subsequent prefetch step of a consecutive opcode instruction from the display list.

* * * * *